June 22, 1965 G. H. JONES 3,189,994
METHOD AND APPARATUS FOR MACHINING NOZZLE
CLUSTERS AND THE LIKE
Filed July 17, 1962 4 Sheets-Sheet 4
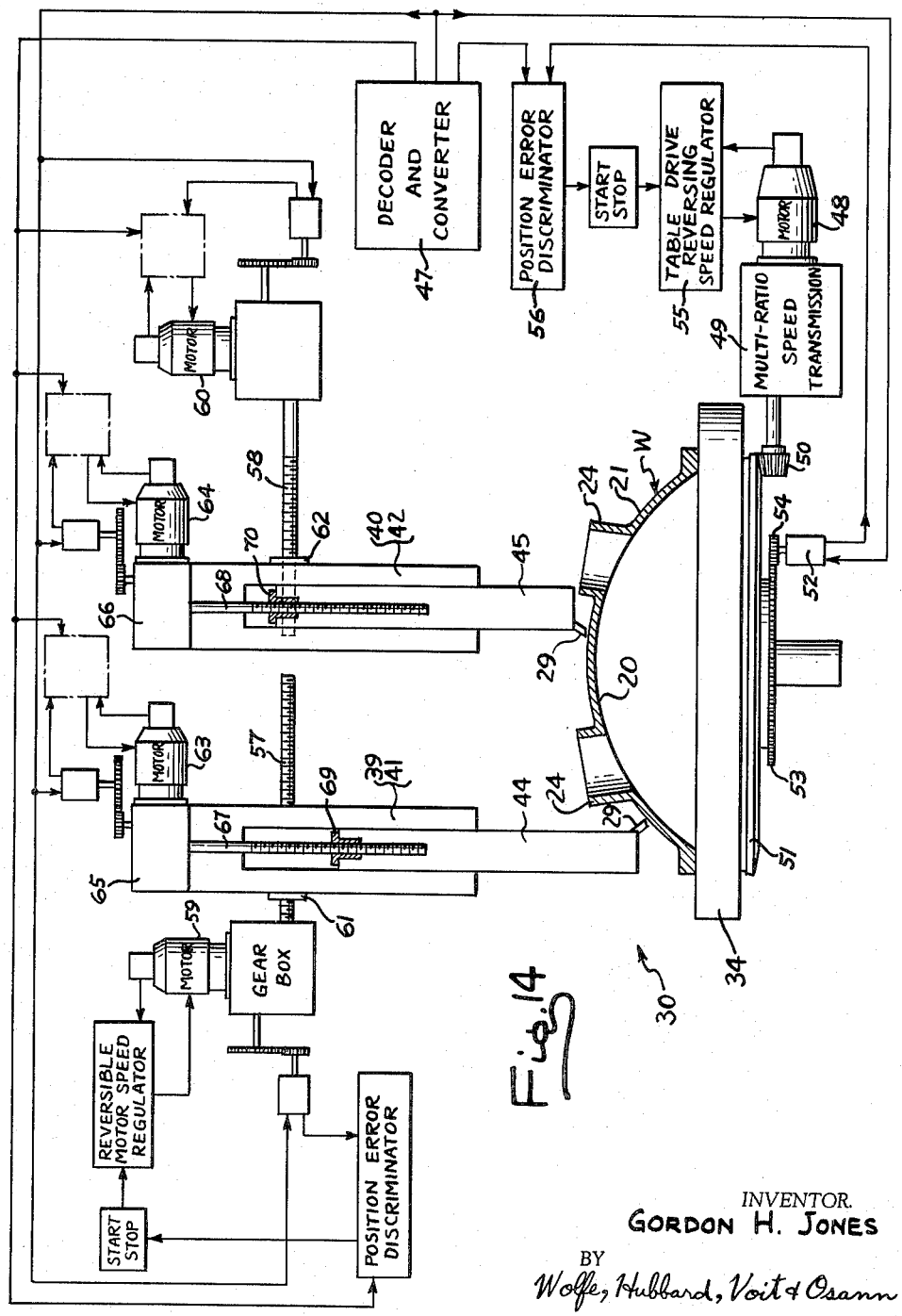
INVENTOR.
GORDON H. JONES
BY
Wolfe, Hubbard, Voit & Osann
ATTYS.

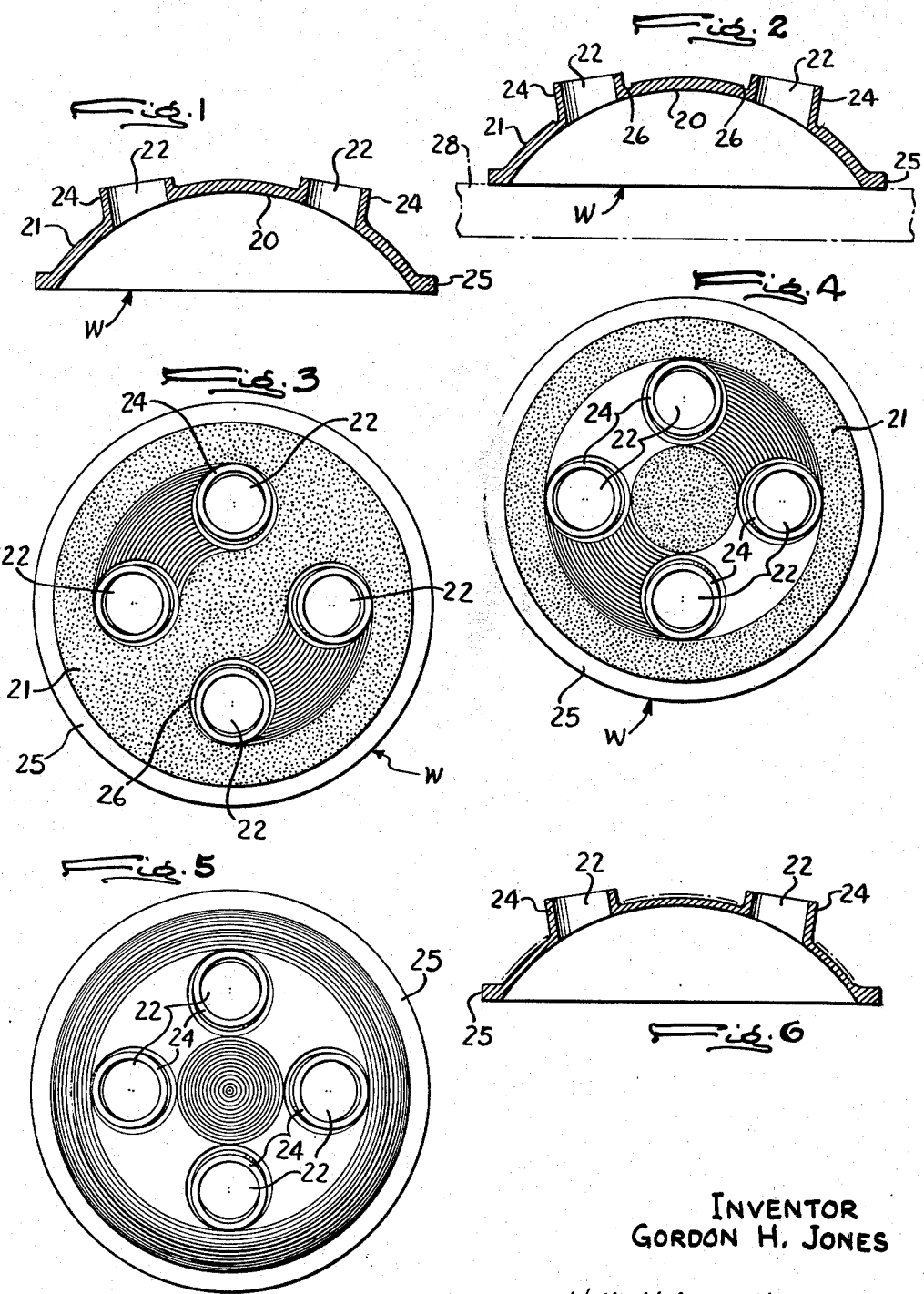

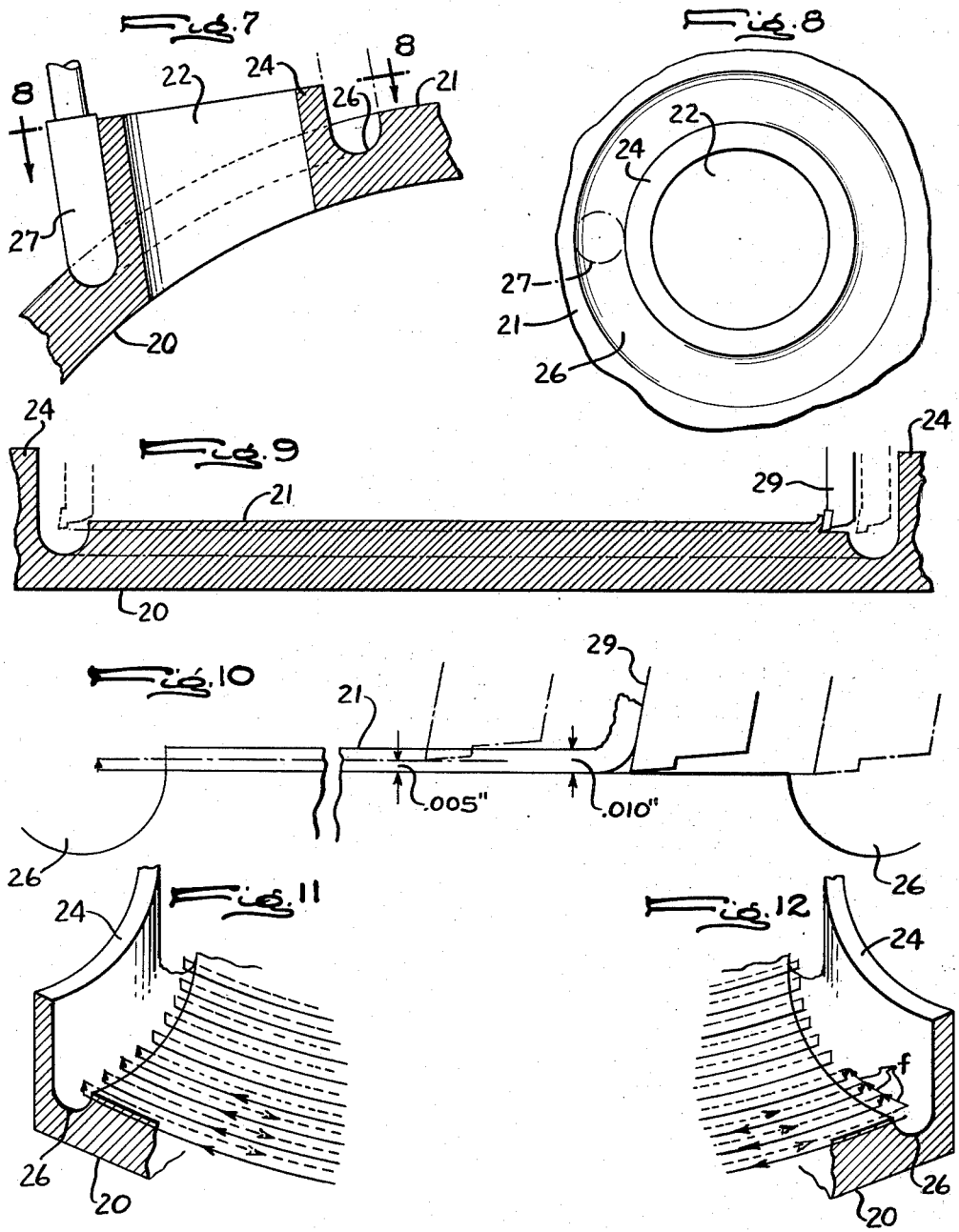

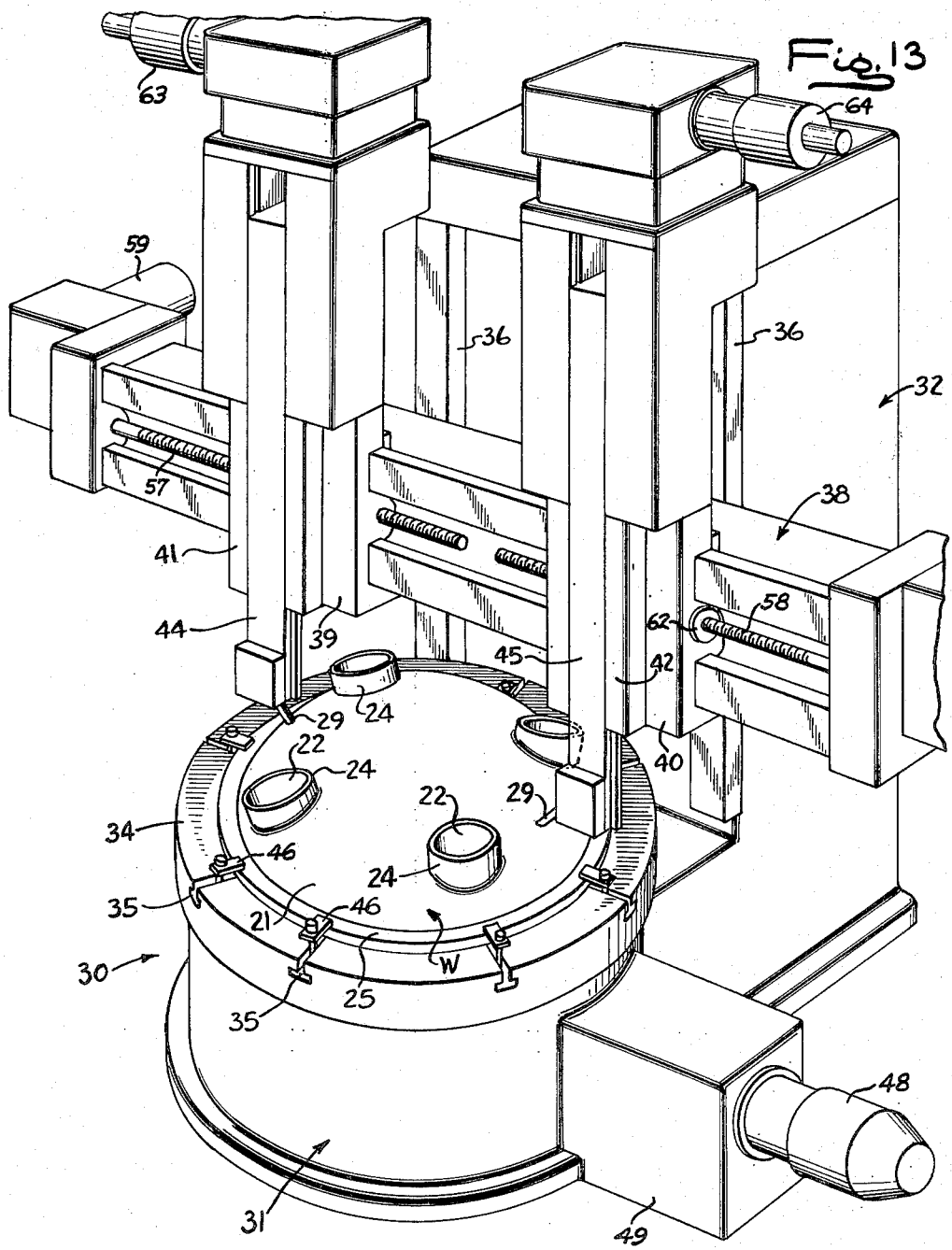

United States Patent Office 3,189,994
Patented June 22, 1965

3,189,994
METHOD AND APPARATUS FOR MACHINING NOZZLE CLUSTERS AND THE LIKE
Gordon H. Jones, Fond du Lac, Wis., assignor to Giddings & Lewis Machine Tool Company, Fond du Lac, Wis., a corporation of Wisconsin
Filed July 17, 1962, Ser. No. 210,474
6 Claims. (Cl. 29—558)

The present invention relates in general to the metal cutting field and, more specifically, to a novel method and apparatus for machining specially contoured workpieces having one or more transverse barriers disposed across the path of relative tool movement. The invention finds particular, but not exclusive, utility in connection with the machining of dome-shaped closures for missiles and wherein each such closure may be formed with a cluster of upstanding nozzle ports or mountings.

One object of the present invention is to provide a method and apparatus for machining contoured workpieces with single point tooling notwithstanding the existence of one or more barriers on the workpiece disposed transversely of the path of relative tool movement.

Another object of the invention is to provide an apparatus of the character set forth above whereby the workpiece may be machined through a single point turning operation.

A further object of the invention is to provide a method and apparatus of the foregoing type wherein the workpiece may be machined by a plurality of single point cutting tools operating simultaneously in response to a common control signal.

Still another object of the invention is to provide a novel method and apparatus for machining by single point turning operation the entire surface of a workpiece such as a missile closure head having a cluster of upstanding nozzle projections in the surface thereof.

Other objects and advantages of the invention will become apparent as the following description proceeds, together with the accompanying drawings, wherein:

FIGURES 1 to 6, inclusive, are sequential sectional and plan views illustrating the successive steps in the machining of an illustrative workpiece such as a missile closure head by the method and apparatus of the present invention.

FIG. 7 is an enlarged fragmentary sectional view through a portion of the workpiece and one of its projecting nozzle ports illustrating the preliminary milling of a relief groove therearound.

FIG. 8 is an enlarged fragmentary plan view of the projecting nozzle port of the workpiece taken in the plane of the line 8—8 in FIG. 7.

FIG. 9 is an enlarged fragmentary vertical sectional view through a section of the workpiece and illustrating removal of metal between nozzle projections by means of a single point cutting tool.

FIG. 10 is a diagrammatic view illustrating the mode of feeding and returning the cutting tool shown in FIG. 9.

FIGS. 11 and 12 are companion diagrammatic views illustrating the paths of relative movement of the tool shown in FIG. 9.

FIG. 13 is a perspective view of one illustrative form of apparatus by which the present invention may be carried out.

FIG. 14 is a simplified diagrammatic view illustrating the various coordinated controls of the illustrative apparatus shown in FIG. 13.

While the invention is susceptible of various modifications and alternative constructions, certain illustrative embodiments and modes have been shown in the drawings and will be described below in considerable detail. It should be understood, however, that there is no intention to limit the invention to the specific form or mode disclosed, but, on the contrary, the intention is to cover all modifications, alternatives and equivalents falling within the spirit and scope of the invention as expressed in the appended claims.

Referring more specifically to FIGS. 1 and 13, there is shown an illustrative workpiece W which is to be machined by the method and apparatus of the present invention. In this instance, the workpiece W happens to be the after closure of a missile. It comprises a dome-shaped structure of relatively large diameter having a concave interior surface 20 and a convex exterior surface 21. A plurality of nozzle ports 22, in this instance four in number, extend transversely through the closure member W and are surrounded by upstanding annular flanges 24. The latter in this instance extend outwardly from the convex surface 21 and define upstanding transverse barriers thereon. The member W also includes a relatively large peripheral mounting flange 25 by means of which it may be held in place during machining operations.

In the practice of the method of the present invention and application thereof to the workpiece W, a tool relief groove 26 is first machined in the exterior surface 21 around each of the nozzle flanges 24. This may conveniently be accomplished, as indicated in FIGS. 7 and 8, by the use of a profile milling cutter 27. The profile cutter 27 is moved about the periphery of each nozzle flange 24 and into the surface 21 so as to make the groove 26 of a depth substantially equal to the thickness of metal to be removed from the surface 21. This may be done under manual control or through a numerically controlled or tracer controlled profile milling machine.

Following completion of the tool relief groove 26 around each nozzle flange, the workpiece W is then secured to a support 28 (FIG. 2), as by means of its mounting flange 25, in preparation for machining the remaining portions of the surface 21. One such portion is defined by the interrupted circular areas between the upstanding barriers or nozzle flanges 24, while the other such portion is defined by uninterrupted circular areas free of nozzle flange interference and which would permit continuous relative tool movement. In the present instance, the former portion, namely the interrupted areas between the nozzle flanges, will be machined first although there may be some instances when it may be more desirable to do this after the uninterrupted areas of the surface 21 have been machined.

With the workpiece W mounted on a support 28, provision is made for machining the interrupted areas of the exterior surface 21 by oscillating the workpiece relative to a single point cutting tool 29 through strokes of progressively varying length and location extending from the tool clearance groove 26 of one nozzle flange 24 to the tool clearance groove of the adjacent nozzle flange. This is accomplished by coordinating the relative movement and speed of the work support and workpiece, on the one hand, and the cutting tool, on the other hand, to define a path and rate of relative tool movement resulting in a rotary planing action. Referring more specifically to FIGS. 9 to 12, inclusive, the cutting and return strokes of the tool 29, the tool feed, and chip thickness or depth of cut, are there shown diagrammatically for the illustrative workpiece W. The cutting stroke and tool feed are designated by solid directional lines and return stroke by a dot-dash line. In the present instance, as shown in FIGS. 10 and 12, the tool 29 is set for a depth of cut of 0.010″. The cutting stroke starts at the groove 26 associated with the right-hand nozzle flange 24, the tool 29 moving leftwardly relative to the workpiece as illustrated in FIGS. 10, 11 and 12 until it reaches the relief groove 26 of the left-hand nozzle flange 24. The tool 29 is thereupon lifted a slight clearance distance, for example, 0.005", and returned along the same path to its starting point. The tool is thereupon shifted through a feed increment "f" along the trough 26 which may, for example, be 0.020", and at approximately the same time is lowered another few thousandths to define the desired chip thickness or depth of cut, in this case 0.010", for the next cutting stroke. The tool 29 thereupon moves through the next cutting stroke, which happens to be shorter than the previous one because of the contour of the workpiece and the starting point of the rotary planing operation. This cycle is repeated with each cutting stroke varying progressively in length and location until this particular interrupted area has been machined to the prescribed dimensions. The other interrupted areas of the workpiece W may be machined in like manner.

In the practice of the invention, a pair of single point cutting tools 29 may be utilized simultaneously to machine diametrically opposed interrupted areas between nozzle flanges, as indicated in FIGS. 3 and 4. In such event, the cutting tools 29 are subjected to simultaneous control and programming so as to have substantially identical relative motions and speeds with respect to the workpiece. Upon completion of the machining of these areas, the other pair of opposed interrupted areas is machined in like manner, leaving the workpiece in the condition illustrated in FIG. 5. The simultaneous use of two tools permits doubling of the feed rate and a substantial reduction in the time involved in machining the interrupted areas.

At this point, it will be noted that machining of the uninterrupted areas, such as those shown in FIG. 5, may be accomplished by means of continuous turning operation rather than through rotary planing. In this instance, one of the interrupted areas happens to be in the central portion of the workpiece and the other along the outer peripheral portion. In the application of the method of the present invention, the order in which these latter two areas are machined is not important.

Upon reflection, the applicability of the present method to other forms of workpieces than the one specifically illustrated herein will become apparent. For example, the present method may be utilized to good advantage in machining a workpiece with only a single eccentrically mounted nozzle flange or other barrier. The interrupted area on such a workpiece would be almost circular. Rotary planing of that area would involve oscillation of a single point cutting tool relative to the workpiece from the tool clearance groove on one side of the nozzle flange to the diametrically opposed portion of such groove on the opposite side of the nozzle flange.

The method of the present invention is also applicable with equal facility to workpieces of the character set forth herein but with the barriers or interruptions projecting inwardly from the concave side as well as outwardly from the convex side.

Turning now to FIGS. 13 and 14, there is shown one illustrative form of apparatus 30 embodying another aspect of the invention and by means of which the method disclosed above may be practiced. In this instance, the apparatus 30 incorporates a machine such as a vertical boring mill. The latter comprises a bed 31 with a relatively large integral column 32 rising at one end thereof. Situated on the bed 31 in front of the base of the column 32 is a table 34 journaled for rotation about a vertical axis. The top surface of the table 34 may be formed with a plurality of radially disposed T-slots 35 adapted to receive work-engaging clamping devices in a well-known manner.

The column 32 is provided with vertically disposed ways 36 on which a cross rail 38 is mounted for vertical sliding movement, being adjustably positionable along the way 36 in a well-known manner. Mounted on saddles 39, 40, adapted to traverse the cross rail 38, are ram heads 41, 42. The latter are equipped respectively with tool carrying rams 44, 45 slidably and adjustably positionable in a vertical direction with respect to the ram heads. Each of the rams 44, 45 in this case is adapted to carry a single point cutting tool 29.

The apparatus 30 is adapted to receive the workpiece W for processing in accordance with the method described above. To this end, the workpiece W may be secured to the table 34 as by means of clamps 46 which engage its outer peripheral flange 25, the table 34 corresponding to the work support 28 mentioned earlier herein. Preferably, the tool relief grooves 26 are machined in the workpiece W prior to mounting it on the table 34.

Provision is made in the apparatus 30 for machining of the interrupted areas on the surface 21 of the workpiece by a rotary planing operation, and for machining of the uninterrupted areas by a continuous turning operation. Accordingly, the apparatus 30 includes a servo drive system (FIG. 14) adapted to carry out a predetermined, coordinated program of relative tool movement. Such program may, for example, be defined by numerical control data supplied in digital form to the decoder and converter unit 47 illustrated diagrammatically in FIG. 14. The unit 47 is adapted to convert this data into individual analogue signals which are then applied in accordance with the program to the respective position error discriminators of the individual servo drives throughout the system.

As indicated in FIG. 14, the table 34 is driven by servo motor 48, multispeed transmission 49, and output bevel pinion 50 which engages a large diameter bevel ring gear 51 on the underside of the table. The table drive control includes a feedback signal means in the form of a synchro 52 coupled to the table as by means of a relatively large spur gear 53 and pinion 54. The servo motor 48 is controlled by a table drive reversing speed regulator 55 which, in turn, is controlled by a position error discriminator 56. The latter compares the command signal from the decoder and converter 47 with the feedblock signal from the synchro 55 and causes the table to be driven accordingly. The table drive reversing speed regulator 55 may also have a conventional start-stop control associated therewith to permit manual operation and jogging.

By the same token, the tool carrying rams 44, 45 are adapted to be moved vertically and horizontally by appropriate servo drives to control tool feed and depth of cut in timed relation to the movement of the table and workpiece. To traverse the rams horizontally along the cross rail, saddles 39, 40 are provided with respective feed screws 57, 58 individually driven by corresponding servo motors 59, 60 and engaging antifriction ball nuts 61, 62. The rams 44, 45 are adapted to be moved in a vertical direction on their respective heads and saddles 41, 39 and 42, 40 by means of servo motors 63, 64 and vertical feed transmissions 65, 66. The latter drive vertical feed screws 67, 68, respectively, which engage corresponding ball nuts 69, 70.

The relation of each of the ram drives to the system is similar to that already discussed in connection with the table, the motor driving the screw through the gear box in accordance with a signal from the position error discriminator based on a comparison of the signal from decoder and converter 47 and the feedback signal from a synchro. Since the drives for all the ram feeds are substantially identical, only one (the drive for the feed screw 57) has been detailed in FIG. 14 and the others have simply been diagrammatically indicated by dot-dash boxes. These dot-dash boxes, associated with the feed screws 58, 67 and 68, each represents the same combination of control and drive components shown in detail for the ram feed screw 57.

I claim as my invention:

1. A method of machining workpieces having a plurality of upstanding barriers thereon, said method comprising the steps of forming a tool relief groove around the perimeter of each said barrier, machining the areas between said barriers by rotary planing while oscillating the workpiece, and machining the remaining areas that are free of barrier interference by continuous turning.

2. A method of machining a workpiece having an upstanding barrier situated eccentrically thereon and defining an interrupted arcuate area in the surface thereof as well as an uninterrupted area in said surface, forming a tool relief groove about the perimeter of said barrier, machining said interrupted area by rotary planing while oscillating the workpiece, and machining said uninterrupted area by continuous turning.

3. A method of machining the end closure of a missile having a plurality of upstanding nozzle flanges defining in the surface thereof a plurality of interrupted arcuate areas and a plurality of uninterrupted areas, said method comprising the steps of forming a tool relief groove around the perimeter of each said nozzle flange, machining the interrupted areas between said nozzle flanges by rotary planing with a single point cutting tool while oscillating said closure, and machining the uninterrupted areas by continuous turning.

4. Apparatus for machining a missile end closure having a plurality of upstanding nozzle flanges defining in the surface thereof a plurality of interrupted arcuate areas, said surface having a tool relief groove about each said nozzle flange, said apparatus comprising in combination, a work support adapted to hold said closure, servo control means for driving said work support with oscillatory or continuous rotary motion, a single point cutting tool, a support for said tool, servo control means for moving said tool support and said tool axially and transversely of said work support, and means for applying a predetermined program of relative tool movement to said servo control means whereby said interrupted arcuate areas are machined by a rotary planing operation.

5. Apparatus for machining a workpiece having a plurality of upstanding barriers defining in the surface thereof a plurality of interrupted arcuate areas, said surface having a tool relief groove about each said barrier, said apparatus comprising, in combination, a work support adapted to hold said workpiece, servo control means for driving said work support with oscillatory or continuous rotary motion, a plurality of single point cutting tools, supports for said tools, servo control means for moving said tool supports and said tools axially and transversely of said work support, and means for applying a predetermined program of relative tool movement to said servo control means whereby said interrupted arcuate areas are machined by said single point cutting tools simultaneously and with progressively varying strokes in a rotary planing operation.

6. Apparatus for machining a workpiece having a plurality of upstanding barriers defining in the surface thereof interrupted arcuate areas, said surface further having uninterrupted areas and a tool relief groove about each said barrier, said apparatus comprising, in combination, a work support adapted to hold said workpiece, servo control means for driving said work support with oscillatory or continuous rotary motion, a single point cutting tool, a support for said tool, servo control means for moving said tool support and said tool axially and transversely of said work support, and means for applying a predetermined program of relative tool support and work support movement to said servo control means including oscillatory rotary movement of said work support for machining interrupted arcuate areas between said tool relief grooves by rotary planing operations and continuous rotary movement of said work support for machining said uninterrupted areas by continuous turning operations.

References Cited by the Examiner
UNITED STATES PATENTS

| 355,562 | 1/87 | Schwitter | 90—24.3 |
| 2,364,645 | 12/44 | Mott et al. | |
| 2,894,186 | 7/59 | Cail et al. | |
| 2,949,742 | 8/60 | Williamson et al. | |

OTHER REFERENCES

Wilson: ASTE technical paper, vol. 58, paper 108, May 8, 1958.

WILLIAM W. DYER, JR., *Primary Examiner.*

LEON PEAR, *Examiner.*